United States Patent Office 3,707,539
Patented Dec. 26, 1972

3,707,539
5-PHENYL-7-TRIFLUOROMETHYL-1H-1,5-BENZO-DIAZEPINE-2,4-DIONES
Karl-Heinz Weber, Gau-Algesheim, Karl Zeile, Peter Danneberg, and Rolf Giesemann, Ingelheim, and Karl Heinz Hauptmann, deceased, late of Ingelheim am Rhein, Germany, by Maria Hauptmann, heir, Bonn (Rhine), Germany; said Weber, Zeile, Danneberg, and said Giesemann assignors to Boehringer Ingelheim G.m.b.H., Ingelheim am Rhein, Germany
No Drawing. Continuation-in-part of application Ser. No. 89,482, Nov. 13, 1970, which is a continuation of abandoned application Ser. No. 703,188, Feb. 5, 1968. This application Feb. 1, 1971, Ser. No. 111,713
Claims priority, application Germany, Feb. 7, 1967, B 91,071; Jan. 18, 1968, B 96,281, B 96,282
Int. Cl. C07d 53/04
U.S. Cl. 260—239.3 B   10 Claims

ABSTRACT OF THE DISCLOSURE

Compounds of the formula

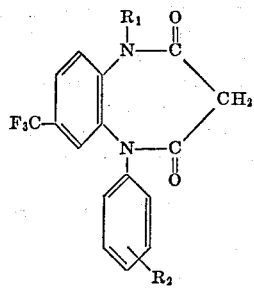

wherein
$R_1$ is hydrogen, alkyl of 1 to 3 carbon atoms, hydroxy-alkyl of 2 to 3 carbon atoms, allyl or (cycloalkyl of 3 to 6 carbon atoms)-methyl, and
$R_2$ is hydrogen, halogen, trifluoromethyl or methoxy; the compounds are useful as psychosedatives and anticonvulsives.

---

This is a continuation-in-part of copending application Ser. No. 89,482, filed Nov. 13, 1970, now abandoned, which in turn is a continuation of application Ser. No. 703,188, filed Feb. 5, 1968, now abandoned.

This invention relates to novel 5-phenyl-7-trifluoromethyl-1H-1,5-benzodiazepine-2,4-diones and methods of preparing these compounds.

More particularly, the present invention relates to compounds of the formula

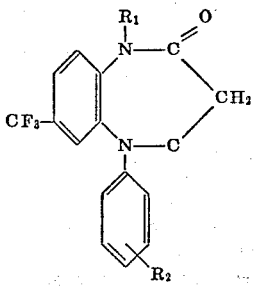

wherein
$R_1$ is hydrogen, alkyl of 1 to 3 carbon atoms, hydroxy-alkyl of 2 to 3 carbon atoms, allyl or (cycloalkyl of 3 to 6 carbon atoms)-methyl, and
$R_2$ is hydrogen, halogen, trifluoromethyl or methoxy.

The compounds according to the present invention may be prepared by a number of different methods involving well known chemical principles, among which the following have proved to be particularly convenient and efficient:

Method A

By cyclizing an N-phenyl-N-(2-amino-5-trifluoromethylphenyl)-malonic acid lower alkyl ester amide of the formula

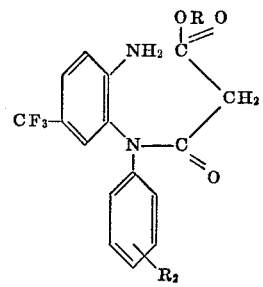

wherein R is lower alkyl and $R_2$ has the same meanings as in Formula I, and, if desired, subsequently alkylating the cyclization product in the 1-position.

Method B

By cyclizing a 2-amino-5-trifluoromethyl-diphenylamine of the formula

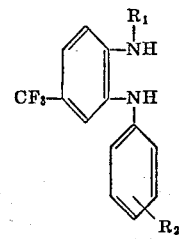

wherein $R_1$ and $R_2$ have the same meanings as in Formula I, with a malonic acid or alkylmalonic acid dihalide and, if desired, alkylating the cyclization product thus obtained in the 1-position.

In method A the hydrolysis and ring closure proceed smoothly and with good yields in an acid as well as an alkaline medium, preferably in the presence of an alcoholic or aqueous alcoholic solvent; however, other inert solvents such as tetrahydrofuran or dioxan, are also suitable; for acid cyclization, acetonitrile may also be used as the solvent. Mineral acids, and particularly hydrohalic acids, such as hydrochloric acid, hydrobromic acid, hydroiodic acid, sulfuric acid, phosphoric acid and perchloric acid are preferably used as acid cyclization agents. Examples of alkaline cyclization agents are sodium alcoholates and alkali metal hydroxides.

The reaction periods depend upon the quantity of acid or alkali employed and upon the type of solvent used; they vary between several hours and several days. The preferred reaction temperatures are preferably between +20° C. and the boiling point of the solvent which is used.

The preparation of an end product of the Formula I, wherein $R_1$ is unsubstituted or hydroxy-substituted alkyl, may be carried out in various ways. One may, for instance, start from a compound of Formula I wherein $R_1$ is hydrogen and exchange the same for an alkyl group with the aid of a customary alkylating agent, such as an alkyl halide or an alkyl sulfate, such as a dialkylsulfate. For this purpose an alkali metal salt of a compound of Formula I is dissolved or suspended in a suitable solvent, the alkylating agent is added to the solution or suspension, and the reaction mixture is heated. For the preparation of an end product of the Formula I wherein $R_1$ is hydroxyalkyl, a compound of the Formula I wherein $R_1$ is hydrogen may be reacted with an alkyleneoxide in the presence of a strong base, such as Triton–B. If the cyclization is carried out under alkaline conditions, the alkylation of the 1-position may also be effected after the cyclization is finished, without prior isolation of the 1-unsubstituted benzodiazepine-2,4-dione cyclization product. In this case the alkylating agent is added to the cyclization reaction solution containing the cylization product, and the mixture heated.

In method B the reaction is preferably carried out in the presence of a suitable inert organic solvent, such as benzene, toluene, xylene, tetrahydrofuran, dioxan or dimethylformamide, at room temperature or, more advantageously, at the boiling point of the particular solvent which is used. In some cases the addition of a tertairy organic base, such as pyridine, has proved to have a favorable influence upon the course of the reaction. An end product of the Formula I, wherein $R_1$ is hydrogen, may optionally be subsequently alkylated, as described in conjunction with method A.

Furthermore, in a compound of general Formula I, wherein $R_1$ is allyl, this substituent may be partially or completely hydrogenated by known methods.

The N - phenyl - N - (2 - amino-5-trifluoromethylphenyl)-malonic acid lower alkyl ester amides of the Formula II used as starting materials for method A are also novel. They may be prepared by reacting a correspondingly substituted N-phenyl-N-(2-nitro-5-trifluoromethyl-phenyl)-amine with a malonic acid monoalkyl ester halide to obtain an N-phenyl-N-(2-nitro-5-trifluoromethyl-phenyl)-malonic acid alkyl ester amide, and subsequently reducing the nitro group according to the following reaction sequence:

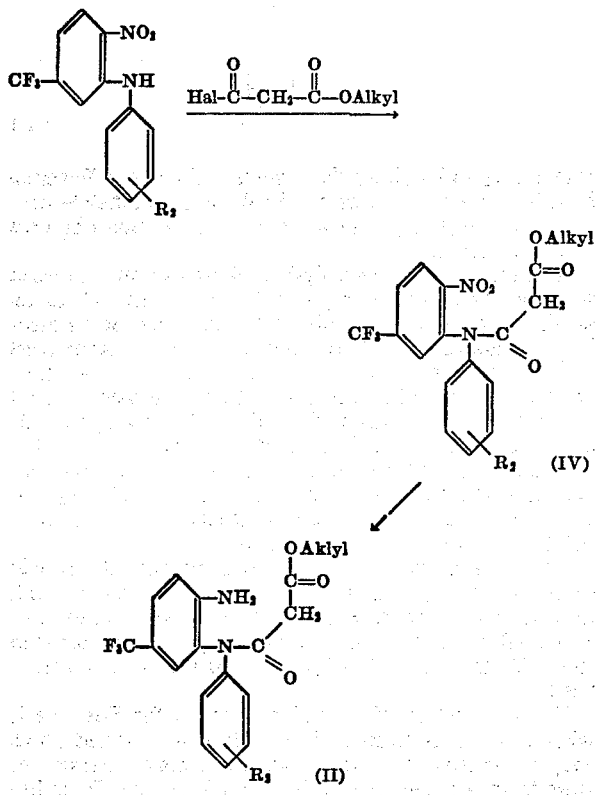

wherein $R_2$ has the samemeanings as in Formula I.

Thus, the preparation of an N-phenyl-N-(2-nitro-5-trifluoromethyl-phenyl)malonic acid alkyl ester amide of the Formula IV is carried out, for example, by heating a solution of N-phenyl-N-(2-nitro-5-trifluoromethyl-phenyl)-amine in a suitable solvent, such as benzene, toluene or xylene, with a malonic acid alkyl ester halide, whereby the nitro compound IV is always obtained with good yields (80%) and in crystalline form.

The subsequent reduction of compound IV may be effected by nascent or catalytic hydrogenation, for example, by hydrogenation with Raney-nickel or with a mixture of iron and glacial acetic acid.

For the cylization to form the 5-phenyl-7-trifluoromethyl - 1H - 1,5 - benzodiazepine - 2,4-dione end product of the Formula I it is not absolutely necessary to start from an isolated compound of the Formula II; instead, the solution containing the hydrogenated intermediate product II may directly be treated with the cylization agents mentioned above, after removal of the catalyst.

The starting compounds of the Formula III wherein $R_1$ is hydrogen may be prepared by conventional methods, for example, by catalytic reduction of the corresponding 2-nitrodiphenylamine. Starting compounds of the Formula III wherein $R_1$ is alkyl may be obtained analogous to the method described in Chem. Berichte, volume 34, page 4204 (1902), and volume 37, page 552 (1904), that is, by cyclizing a 2-aminodiphenylamine with formic acid, alkylating at the nitrogen atom in the cyclization product by means of an alkyl iodide, and subsequently splitting the ring with an alkali.

The following examples further illustrate the present invention and will enable others skilled in the art to understand it more completely. It should be understood, however, that the invention is not limited solely to the particular examples given below.

EXAMPLE 1

5-phenyl-7-trifluoromethyl-1H-1,5-benzodiazepine-
2,4-(3H,5H)-dione by method A 7.7 gm. of the N-phenyl-N-(2-amino-5-trifluoromethyl-pehnyl)amide of ethyl malonate (M.P. 142–144° C.) were added at room temperature to an ethanolic solution of sodium ethylate prepared from 50 ml. of absolute ethanol and 0.5 gm. of sodium. The resulting solution was allowed to stand at room temperature for three hours, and then the ethanol was distilled off in vacuo, and the residue was taken up in a small amount of water. The resulting aqueous solution was acidified with concentrated hydrochloric acid, and the precipitate formed thereby was collected. 3.6 gm. (55% of theory of 5-phenyl-7-trifluoromethyl - 1H - 1,5 - benzodiazepine - 2,4-(3H,5H)-dione, M.P. 258–260° C., of the formula

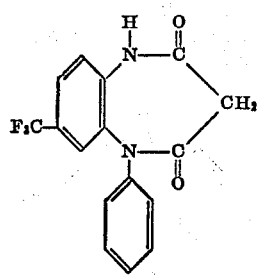

were obtained.

The starting compound was prepared as follows:
11.2 gm. of N-phenyl-N-(2-nitro-5-trifluoromethylphenyl)-amine and 7.1 gm. of the ethyl ester of malonic acid chloride were dissolved in 100 ml. of benzene, and the solution was refluxed for 3.5 hours. Thereafter, the reaction solution was washed with aqueous sodium bicarbonate and with water, and then the benzene was evaporated in vacuo. Upon addition of ethanol to the residue, 13.3 gm. (85% of theory) of the N-phenyl-N-(2-nitro-5-trifluoromethyl-phenyl)-amide of ethyl malonate, M.P. 84–85° C., crystallized out. This product was dissolved in methanol, and the solution was hydrogenated at room temperature and under a pressure of 6 atmospheres gauge in the presence of Raney nickel until the calculated amount of hydrogen had been absorbed. Thereafter, the catalyst was filtered off, the solvent was distilled out of the filtrate, and the residue was recrystallized from a small amount of methanol. 7.7 gm. (62.5% of theory) of the N - phenyl - N - (2-amino-5-trifluoromethyl-phenyl)-amide of ethyl malonate, M.P. 142–144° C., were obtained.

EXAMPLE 2

1-methyl-5-(2'-trifluoromethyl-phenyl)-7-trifluoromethyl-1H-1,5-benzodiazepine-2,4-(3H,5H)-dione 38.8 gm. (0.1 mol) of 5-(2'-trifluoromethyl-phenyl)-7-trifluoromethyl - 1H-1,5 - benzodiazepine-2,4-(3H,5H)-dione, prepared by a procedure analogous to that described in Example 1 from the N-(2'-trifluoromethyl-phenyl)-N-(2-amino-5-trifluoromethyl-phenyl)-amide of ethyl malonate and sodium ethylate, were suspended in 750 ml. of absolute tetrahydrofuran, 5 gm. of a 50% dispersion of sodium hydride in tetrahydrofuran were added, and the resulting mixture was stirred at room temperature for two hours, whereby a clear solution was formed. 0.2 mol of methyl iodide was added to the solution, and the mixture was refluxed for a few hours. Thereafter, the reaction solution was evaporated in vacuo, water was added to the residue, and the aqueous mixture was extracted with methylene chloride. The extract solution was freed from insoluble matter, dried and evaporated, and the residue was recrystallized from isopropyl ether. 31.4 gm. (78% of theory) of 1-methyl-5-(2'-trifluoromethyl-phenyl)-7-trifluoromethyl - 1H - 1,5 - benzodiazepine-2,4-(3H,5H)-dione, M.P. 164–165° C., of the formula

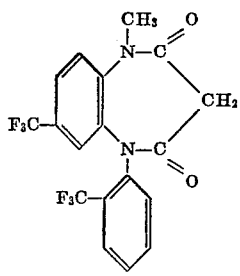

were obtained.

EXAMPLE 3

1-methyl-5-phenyl-7-trifluoromethyl-1H-1,5-benzodiazepine-2,4-(3H,5H)-dione by method B 13.3 gm. (0.05 mol) of N-(2-methylamino-5-trifluoromethyl-phenyl)-aniline (B.P. 140–145° C. at 0.1 mm. Hg) were dissolved in 250 ml. of absolute chloroform, the solution was heated to 50° C. and then, while stirring it, 10 gm. of malonic acid dichloride were added thereto over a period of five minutes. The resulting mixture was then stirred at 50° C. for four hours more, thereafter cooled, poured into ice water, and the aqueous mixture was made slightly alkaline with ammonia. The chloroform phase was separated, washed with water, dried and evaporated, and the residue was recrystallized from methylene chloride/isopropyl ether. 25–30% of theory of the compound of the formula

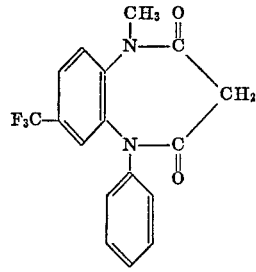

having a melting point of 203–205° C. was obtained.

EXAMPLE 4

1-methyl-5-(2'-chloro-phenyl)-7-trifluoromethyl-1H-1,5-benzodiazepine-2,4-(3H,5H)-dione by method B A solution of 15.0 gm. (0.05 mol) of N-(2-methylamino - 5 - trifluoromethyl-phenyl)-N-(o-chloro-phenyl)-amine (B.P. 146–148° C. at 0.03 mm. Hg), 10 gm. of triethyl-amine in 250 ml. of chloroform was heated to 50° C., 10 gm. of malonic acid dichloride were added dropwise thereto over a period of 10 minutes while stirring, and then the mixture was stirred for five hours at 50° C., after which the reaction had gone to completion. The reaction mixture was thereafter washed with water, and the chloroform phase was worked up as described in the preceding example. The colorless crystalline compound of the formula

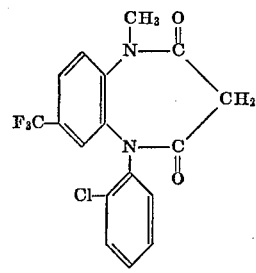

having a melting point of 175–177° C. was obtained.

EXAMPLE 5

Using a procedure analogous to that described in Example 3, 5-phenyl-7-trifluoromethyl-1H-1,5-benzodiazepine-2,4-(3H,5H)-dione, colorless needles, M.P. 258–260° C. (recrystallized from ethanol), was prepared from a solution of 12.6 gm. (0.05 mol) of N-(2-amino-5-trifluoromethyl-phenyl)-aniline (M.P. 58–60° C.) in 300 ml. of chloroform and 10 gm. of malonic acid dichloride.

EXAMPLE 6

Using a procedure analogous to that described in Example 3, 5-(2'-chloro-phenyl)-7-trifluoromethyl-1H-1,5 - benzodiazepine-2,4-(3H,5H)-dione, colorless shiny scales, M.P. 230–232° C. (recrystallized from methanol), was prepared by reacting 14.4 gm. (0.05 mol) of N-(o-chloro - phenyl) - N-(2-amino-7-trifluoromethyl-phenyl)-amine (M.P. 48–50° C.) in 300 ml. of methylene chloride in the presence of 8.5 gm. of absolute piperidine at 50° C.

The starting compound was prepared as follows:

A mixture consisting of 20.6 gm. (0.1 mol) of 2-nitro-5-trifluoromethyl-aniline, 20 gm. of copper powder, 12.5 gm. of potassium acetate and 250 ml. of o-chloro-bromo-benzene was heated for 10 hours at 200° C. in an autoclave. Thereafter, the reaction mixture was allowed to cool, then vacuum-filtered through charcoal, the filter cake was washed with benzene, the combined filtrate and wash solution was evaporated, and the residue was recrystallized from a small amount of methanol, yielding 11 gm. of N-(o-chloro-phenyl)-N-(2-nitro-5-trifluoromethyl-phenyl)-amine, M.P. 68–70° C.

9.7 gm. (0.03 mol) of this nitro compound were hydrogenated in methanol at 5 atmospheres and room temperature in the presence of Raney nickel, the catalyst was separated by vacuum filtration, the methanol was evaporated from the filtrate, and the residue was distilled in a high vacuum, yielding N-(o-chloro-phenyl)-N-(2-amino-7-trifluoromethyl-phenyl)-amine.

EXAMPLE 7

Using a procedure analogous to that described in Example 3, 1-methyl-5-(2'-bromo-phenyl)-7-trifluoromethyl-1H-1,5-benzodiazepine-2,4-(3H,5H)-dione, M.P. 194–195° C., of the formula

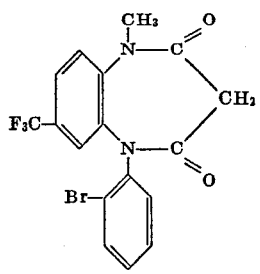

was prepared from N-(2-methylamino-5-trifluoromethyl-phenyl)-N-(o-bromo-phenyl)-amine and malonic acid dichloride.

EXAMPLE 8

Using a procedure analogous to that described in Example 3, 1-methyl-5-(2'-fluoro-phenyl)-7-trifluoromethyl-1H-1,5-benzodiazepine-2,4-(3H,5H)-dione, M.P. 184–186° C., of the formula

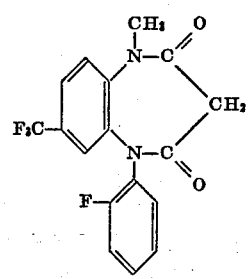

was prepared from N-(2-methylamino-5-trifluoromethyl-phenyl)-N-(o-fluoro-phenyl)-amine and malonic acid dichloride.

EXAMPLE 9

Using a procedure analogous to that described in Example 3, 1-(β-hydroxy-ethyl)-5-phenyl-7-trifluoromethyl-1H-1,5-benzodiazepine - 2,4 - (3H,5H)-dione, M.P. 153–154° C., of the formula

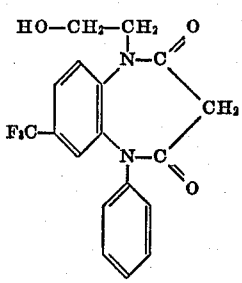

was prepared from N-(2-ethanolamino-5-trifluoromethyl-phenyl)-aniline and malonic acid dichloride.

EXAMPLE 10

Using a procedure analogous to that described in Example 3, 1-(γ-hydroxy-n-propyl)-5-phenyl-7-trifluoromethyl-1H-1,5-benzodiazepine-2,4-(3H,5H)-dione, M.P. 157–159° C., of the formula

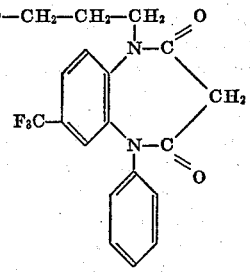

was prepared from N-(2-n-propanolamino-5-trifluoromethylphenyl)-aniline and malonic acid dichloride.

EXAMPLE 11

Using a procedure analogous to that described in Example 3, 1-ethyl-5-phenyl-7-trifluoromethyl-1H-1,5-benzodiazepine-2,4-(3H,5H)-dione, M.P. 180–182° C., of the formula

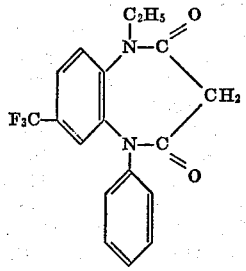

was prepared from N-(2-ethylamino-5-trifluoromethyl-phenyl)-aniline and malonic acid dichloride.

EXAMPLE 12

Using a procedure analogous to that described in Example 3, 1-n-propyl-5-phenyl-7-trifluoromethyl-1H-1,5-benzodiazepine-2,4-(3H,5H)-dione, M.P. 185–188° C., was prepared from N-(2-n-propylamino-5-trifluoromethylphenyl)-aniline and malonic acid dichloride.

EXAMPLE 13

Using a procedure analogous to that described in Example 3, 1-isopropyl-5-phenyl-7-trifluoromethyl-1H-1,5-benzodiazepine-2,4-(3H,5H)-dione, M.P. 176–178° C., was prepared from N-(2-isopropylamino-5-trifluoromethyl-phenyl)-aniline and malonic acid dichloride.

EXAMPLE 14

Using a procedure analogous to that described in Example 3, 1-allyl-5-phenyl-7-trifluoromethyl-1H-1,5-benzodiazepine-2,4-(3H,5H)-dione, M.P. 168–171° C., of the formula

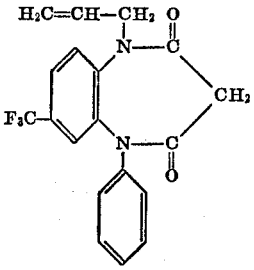

was prepared from N-(2-allylamino-5-trifluoromethyl-phenyl)-aniline and malonic acid dichloride.

EXAMPLE 15

Using a procedure analogous to that described in Example 3, 1-methyl-5-(3'-fluoro-phenyl)-7-trifluoromethyl-1H - 1,5 - benzodiazepine-2,4-(3H,5H)-dione, M.P. 153–157° C., was prepared from N-(2-methylamino-5-trifluoromethyl - phenyl) - N-(3'-fluoro-phenyl)amine and malonic acid chloride.

EXAMPLE 16

Using a procedure analogous to that described in Example 3, 1-methyl-5-(4'-fluoro-phenyl)-7-trifluoromethyl-1H - 1,5 - benzodiazepine-2,4-(3H,5H)-dione, M.P. 191–193° C., was prepared from N-(2-methylamino-5-trifluoromethyl - phenyl) - N-(4'-fluoro-phenyl)-amine and malonic acid dichloride.

EXAMPLE 17

Using a procedure analogous to that described in Example 3, 1-methyl-5-(4'-chloro-phenyl)-7-trifluoromethyl-1H - 1,5 - benzodiazepine-2,4-(3H,5H)-dione, M.P. 188–190° C., of the formula

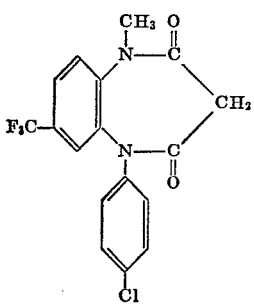

was prepared from N - (2-methylamino-5-trifluoromethyl-phenyl) - N - (4'-chloro-phenyl)-amine and malonic acid dichloride.

EXAMPLE 18

Using a procedure analogous to that described in Example 3, 1 - methyl - 5-(2'-methoxy-phenyl)-7-trifluoromethyl - 1,5 - benzodiazepine - 2,4-(3H,5H)-dione, M.P. 199–201° C., of the formula

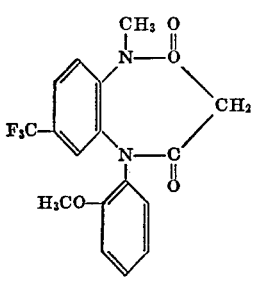

was prepared from N-(2-methylamino-5-trifluoromethyl-phenyl)-N-(2'-methoxy-phenyl)-amine and malonic acid dichloride.

EXAMPLE 19

Using a procedure analogous to that described in Example 3, 1 - methyl - 5-(4'-methoxy-phenyl)-7-trifluoromethyl - 1H - 1,5 - benzodiazepine - 2,4-(3H,5H)-dione, M.P. 170–172° C., was prepared from N-(2-methylamino-5 - trifluoromethyl - phenyl) - N-(4'-methoxy-phenyl)-amine and malonic acid dichloride.

EXAMPLE 20

Using a procedure analogous to that described in Example 3, 1 - methyl - 5-(3'-methoxy-phenyl)-7-trifluoromethyl - 1H - 1,5 - benzodiazepine-2,4-(3H,5H)-dione, M.P. 173–175° C., was prepared from N-(2-methylamino-5 - trifluoromethyl-phenyl)-N-(3'-methoxy-phenyl)-amine and malonic acid dichloride.

EXAMPLE 21

Using a procedure analogous to that described in Example 3, 1 - (cyclopropyl - methyl)-5-phenyl-7-trifluoromethyl - 1H - 1,5-benzodiazepine-2,4-(3H,5H)-dione* of the formula

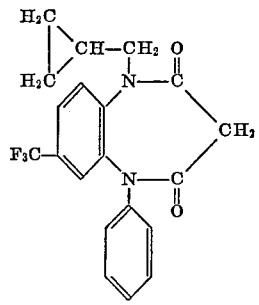

was prepared from N-2-cyclopropylmethyl-amino-5-trifluoromethyl-phenyl)-aniline and malonic acid dichloride.

The compounds according to the present invention, that is, those embraced by Formula I above, have useful pharmacodynamic properties. More particularly, they exhibit very effective psychosedative and anticonvulsive activities in warm-blooded animals, such as mice, rats and dogs, coupled with low toxicity.

Particularly effective are compounds of the Formula I wherein $R_1$ is hydrogen or lower alkyl and $R_2$ is hydrogen or fluorine in the 2-position of the phenyl substituent, and especially 1-methyl-5-phenyl-7-trifluoromethyl-1H-1,5-benzodiazepine-2,4-(3H,5H)-dione.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0166 to 0.833 mgm./kg. body weight, preferably 0.0833 to 0.42 mgm./kg., and the daily dose rate is from 0.166 to 2.5 mgm./kg.

The following examples illustrate a few dosage unit compositions comprising a compound of the instant invention as an active ingredient and represent the best mode contemplated of putting the invention to practical use. The parts are parts by weight unless otherwise specified.

EXAMPLE 22

Coated pills

The pill core composition was compounded from the following ingredients:

|  | Parts |
|---|---|
| 1 - methyl - 5 - phenyl - 7 - trifluoromethyl-1H-1,5-benzodiazepine-2,4-(3H,5H)-dione | 10.0 |
| Lactose | 28.5 |
| Corn starch | 15.0 |
| Gelatin | 1.0 |
| Magnesium stearate | 0.5 |
| Total | 55.0 |

Compounding procedure

The benzodiazepinedione compound was intimately admixed with the lactose and the corn starch, the mixture was moistened with an aqueous 10% solution of the gelatin, the moist mass was forced through a 1 mm. mesh screen, and the granulate obtained thereby was dried at 40° C. and again passed through the screen. The dry granulate was admixed with the magnesium stearate, and the mixture was pressed into 55 mgm.-pill cores, which were subsequently coated with a thin shell with the aid of an aqueous suspension of sugar, talcum, titanium dioxide and gum arabic, and the coated pills were polished

---
* M.P. 185–187° C.

with beeswax. One coated pill contained 10 mgm. of the benzodiazepinedione compound and, when administered to a warm-blooded animal of about 60 kg. body weight in need of such treatment, produced very good tranquilizing and anticonvulsive effects.

The same results were obtained when the benzodiazepinedione compound in the above pill core composition was replaced by an equal amount of one of the following benzodiazepinediones:

(a) 1-ethyl-5-phenyl-7-trifluoromethyl-1H-1,5-benzodiazepine-2,4-(3H,5H)-dione;
(b) 1-n-propyl-5-phenyl-7-trifluoromethyl-1H-1,5-benzodiazepine-2,4-(3H,5H)-dione;
(c) 5-phenyl-7-trifluoromethyl-1H-1,5-benzodiazepine-2,4-(3H,5H)-dione; or
(d) 1-isopropyl-5-phenyl-7-trifluoromethyl-1H-1,5-benzodiazepine-2,4-(3H,5H)-dione.

EXAMPLE 23

Suppositories

The suppository composition was compounded from the following ingredients:

| | Parts |
|---|---|
| 1 - ethyl - 5 - phenyl - 7 - trifluoromethyl-1H-1,5-benzodiazepine-2,4-(3H,5H)-dione | 10.0 |
| Cocoa butter | 1690.0 |
| Total | 1700.0 |

Compounding procedure

The finely powdered benzodiazepinedione compound was stirred, with the aid of an immersion homogenizer, into the cocoa butter which had previously been melted and cooled to about 40° C. The homogenous mixture was then cooled to 35° C. and was poured into cooled suppository molds, each holding 1700 mgm. of the mixture. One suppository contained 10 mgm. of the benzodiazepinedione compound and, when administered by the rectal route to a warm-blooded animal of about 60 kg. body weight in need of such treatment, produced very good tranquilizing and anticonvulsive effects.

The same results were obtained when an equal amount of 5-phenyl-7-trifluoromethyl-1H-1,5-benzodiazepine-2,4-(3H,5H)-dione was substituted for the benzodiazepinedione compound in the above suppository composition.

Analogous results were obtained when any one of the other benzodiazepinediones embraced by Formula I was substituted for the particular benzodiazepinedione in Examples 22 and 23. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

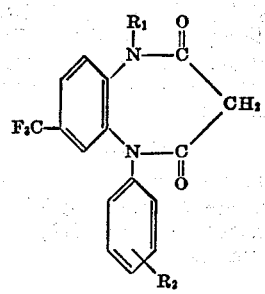

wherein $R_1$ is hydrogen, alkyl of 1 to 3 carbon atoms, hydroxyalkyl of 2 to 3 carbon atoms, allyl or (cycloalkyl of 3 to 6 carbon atoms)-methyl, and $R_2$ is hydrogen, halogen, trifluoromethyl or methoxy.

2. A compound according to claim 1, wherein $R_1$ is alkyl of 1 to 3 carbon atoms or hydroxyalkyl of 2 to 3 carbon atoms, and $R_2$ is hydrogen or 2-fluoro.

3. A compound according to claim 1, wherein $R_1$ is hydrogen or alkyl of 1 to 3 carbon atoms, and $R_2$ is hydrogen or 2-fluoro.

4. A compound according to claim 1, which is 1-methyl-5-phenyl-7-trifluoromethyl-1H-1,5-benzodiazepine-2,4-(3H,5H)-dione.

5. A compound according to claim 1, which is 5-phenyl-7-trifluoromethyl-1H-1,5-benzodiazepine-2,4-(3H,5H)-dione.

6. A compound according to claim 1, which is 1-(β-hydroxy-ethyl)-5-phenyl-7-trifluoromethyl-1H-1,5-benzodiazepine-2,4-(3H,5H)-dione.

7. A compound according to claim 1, which is 1-methyl-5-(2'-fluoro-phenyl)-7-trifluoromethyl-1H-1,5-benzodiazepine-2,4-(3H,5H)-dione.

8. A compound according to claim 1, which is 1-ethyl-5-phenyl-7-trifluoromethyl-1H-1,5-benzodiazepine-2,4-(3H,5H)-dione.

9. A compound according to claim 1, which is 1-n-propyl-5-phenyl-7-trifluoromethyl-1H-1,5-benzodiazepine-2,4-(3H,5H)-dione.

10. A compound according to claim 1, which is 1-isopropyl-5-phenyl-7-trifluoromethyl-1H-1,5-benzodiazepine-2,4-(3H,5H)-dione.

References Cited

Yale: "J. Med. Pharm. Chem." vol. I, pp. 121–133 (1959).

HENRY R. JILES, Primary Examiner

R. T. BOND, Assistant Examiner

U.S. Cl. X.R.

424—244; 260—482 R, 573, 577